3,420,317
BLADE STRUCTURE FOR DITCHING AND CABLE LAYING BLADES INCLUDING A ROTATING CUTTER POINT OR POINTS
Francis B. Ryan, Chariton, Iowa, assignor to F. B. Ryan Manufacturing Company, Chariton, Iowa, a corporation of Iowa
Filed Feb. 18, 1966, Ser. No. 528,471
U.S. Cl. 172—699          2 Claims
Int. Cl. A01b *13/08;* E02f *5/18*

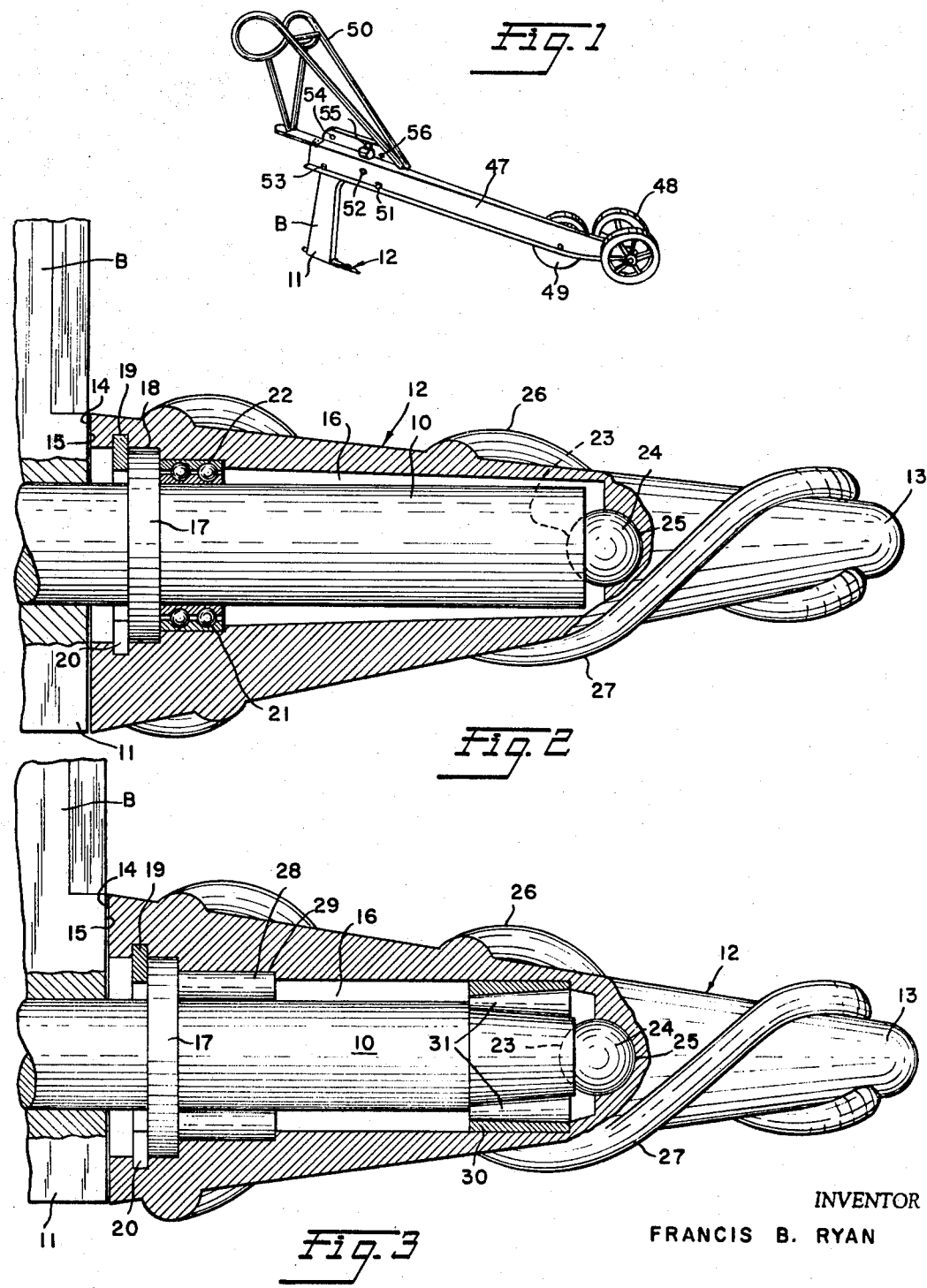

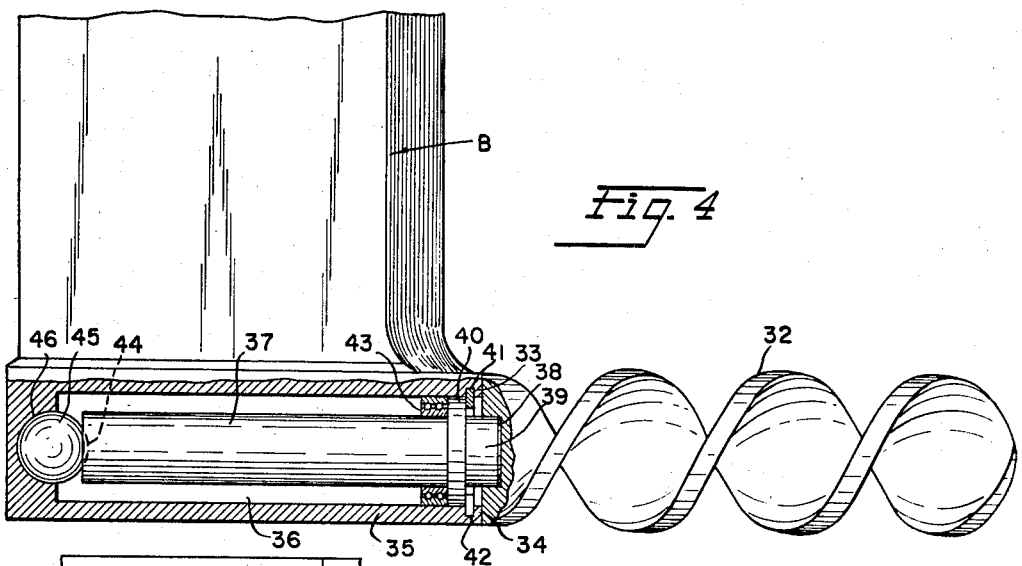
Fig. 4
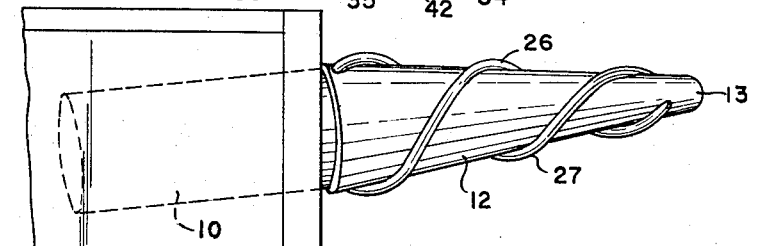
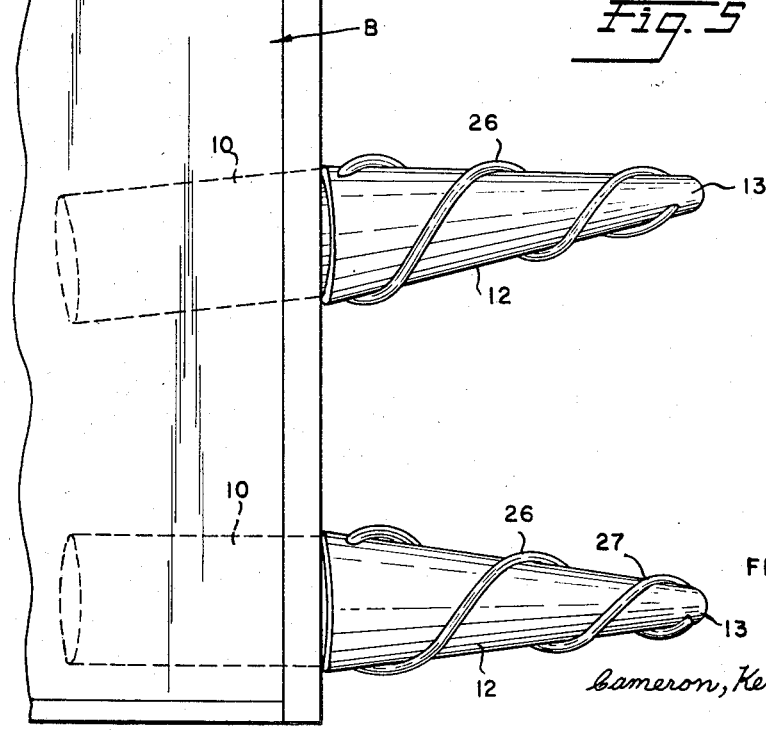
Fig. 5
INVENTOR
FRANCIS B. RYAN
Cameron, Kerkam & Sutton
ATTORNEYS

# United States Patent Office 3,420,317
Patented Jan. 7, 1969

ABSTRACT OF THE DISCLOSURE

The ditching blade herein described comprises a vertical blade, sharpened on its forward edge and provided at its lower or foot extremity with an elongate, spirally ribbed, rotatable cutter point which rotates as the blade is pulled through the ground, facilitating passage of the blade through the ground and imparting vibration thereto, to implement the passage of the blade through the ground. The elongate, conical cutter point is preferably mounted over an elongate shaft affixed in the foot of the blade at right angles thereto and lying in the vertical plane of the blade, upon which the cutter point rotates due to the impingement of its spiral ribs in the ground as the blade is pulled forwardly therethrough.

---

This invention relates to an improved blade structure for ditching, cable laying, pipe laying or other subterranean operation in which the blade is provided with a rotating cutting point, or a series thereof, designed to facilitate passage of the blade through the ground and to set up a vibration or oscillation in the cutting blade to facilitate its passage through the ground. The combination of the rotating cutting point and vibrating blade greatly reduces the power necessary to pull the blade through the ground.

The invention broadly contemplates the provision at the lower extremity of a vertical cutting or ditching blade of a shaft in extension of the foot of the blade upon which is rotatably mounted, for free rotation, an elongate, conical cutting head preferably provided about its longitudinal periphery with spirally disposed upstanding ribs of appreciable height reduced to the forward extremity of the point. Thus, when the blade is pulled through the ground the point will cut and rotate due to the screw effect of the peripheral rib structure to ease its passage through the ground and to set up a vibration in the cutting blade per se to facilitate its passage through the ground.

The cutting point may take a variety of forms, as shown in the drawings, and may, if desired, be of the auger type, shown in FIG. 4, or of the conical type provided with spiral ribs shown in the balance of the figures of the drawings. For smaller blades, one conical, ribbed cutting point may be provided in extension of the foot of the blade, as shown in FIG. 1, or, if desired, a plurality of points may be provided along the forward or cutting edge of the blade, as shown in FIG. 5.

The cutting points may be mounted at a slight angle to the vertical plane of the blade to increase the oscillating or vibrating effect thereof on the blade as the blade is pulled through the ground, rotating the cutting point or points.

In the past, somewhat analogous cutting point structures have been suggested, as shown in Snyder, Patent No. 189,667, of Apr. 17, 1877, and Hoefs, Patent No. 544,850, of Aug. 20, 1895. Another patent of interest is Ryan, No. 1,303,399, of May 13, 1919, which shows a driven cutting point for a blade. It will be noted that the Hoefs structure shows a powered and driven rotating cutter point at the foot of the blade. None of these patents, however, disclose the inventive concept of the present invention.

The cutter point or points of the present invention are designed to be applied to any type of ditching or earth penetrating blade or excavating equipment. Thus, they may be applied to the forward or cutting edge of a vertically disposed ditching or cable laying blade or may be applied to the forward extremities of excavating buckets, shovels or other analogous excavating equipment to facilitate penetration of the cutting edge of the equipment into the ground. Wherever used, the novel cutter points greatly reduce the power demands of the equipment.

As aforesaid, the cutter points are preferably so mounted on their shafts as to be susceptible of some vibrating or rocking movement upon rotation as the blade is pulled through the ground. This vibration will be translated to the cutting edge of the blade to facilitate passage thereof through hard or packed ground or through obstructions therein and will thus reduce the power necessary to pull the blade.

Referring to the drawings, FIG. 1 is a perspective view of a small, power drawn, hand controlled ditching machine with a vertically disposed cutter blade extending downwardly from its rear extremity provided at its foot with a rotating cutting point in accordance with this invention; FIG. 2 is a side view, partially in section and partially broken away, showing one embodiment of a conical cutter point made in conformity with this invention; FIG. 3 is a side view, partially in section and partially broken away, of an alternative embodiment of the cutter point; FIG. 4 is a side view, partially in longitudinal section and broken away of another alternative embodiment of the rotating cutter point in which the penetrating rotating head of the point is in the form of an auger or bit and FIG. 5 is a schematic, fragmentary view, partially in phantom, of a horizontal blade provided with a series of three conical cutter points arranged at varying angularities to the forward or cutting edge of the blade.

In the drawings, referring specifically to FIG. 2 thereof, the conical cutter point is shown rotatably mounted on shaft 10 which is affixed within an appropriate bore or recess within the foot 11 of blade B as by welding or other appropriate means. The foot 11 of blade B is preferably bored or recessed to one half or more of its depth to receive the rear extremity of shaft 10, which is set therein and then appropriately welded to form an integral extension of foot 11. As shown, shaft 10 is preferably aligned in the horizontal plane of the foot 11 of blade B and preferably extends rectilinearly therefrom.

Rotatably mounted on the forward extremity of shaft 10 is cutter point 12, which is preferably formed of steel or an analogous hard alloy. Cutter point 12 is preferably in the shape of an elongate cone and is reduced to its forward extremity 13 and provided at its rear extremity with a circular, flattened base 14 which bears movably or rotatably against the outer, vertical face 15 of the forward extremity of foot 11 of blade B. As shown, point 12 is preferably provided at its interior with a generally cylindrical bore or recess 16, extending about two thirds of its length, within which the forward extremity of shaft 10 is fitted. It will be noted that bore 16 is progressively enlarged to its rear or base extremity and is more restricted with respect to shaft 10 toward its forward extremity, shaft 10 having full lateral clearance within recess 16, at its forward extremity. Shaft 10 is preferably provided about its rear extremity with a cylindrical bearing surface 17 which fits rotatably within peripheral slot 18 provided within the rear, inner periphery of point 12. Located adjacent to slot 18 in the inner periphery of point 12 is an additional peripheral slot 19 in the inner wall of point 12 designed to receive a resilient, split locking ring 20 which, as shown, bears closely against the rear face of cylindrical bearing surface 17 of shaft 10.

Ball bearing race 21 is preferably provided about shaft 10 within peripheral recess 22 provided adjacent and forwardly of bearing recess 18 within the bore 16 of point 12. Ball bearing race 21 is provided to insure free rotation of point 12 on shaft 10 and to reduce the friction of such rotation.

At its forward extremity shaft 10 is preferably provided with hemispherical recess 23 to receive a ball bearing 24 which is fitted at its forward extremity into a hemispherical recess 25 provided within the forward portion of point 12 in the forward wall of bore 16 thereof. Ball bearing 24 acts to insure proper alignment of point 12 on shaft 10 and to facilitate rotation of point 12 thereon.

It will be noted that the bore 16 of point 12 is preferably disposed therein slightly off-center of the longitudinal axis of point 12, to insure slightly eccentric rotation of point 12 on shaft 10, which eccentric rotation will set up vibrations or oscillations in blade B as point 12 rotates on shaft 10, these vibrations facilitating the passage of blade B through the ground being penetrated.

As shown, a pair of spirally disposed fins or ribs 26 and 27 are applied over the exterior surface of point 12, as by welding, or other appropriate means, or they may be cast or otherwise formed integrally with point 12. Ribs 26 and 27 are preferably rounded and of appreciable height and are preferably reduced to their forward extremities adjacent the tip 13 of point 12. They are preferably opposed to each other on the outer surface of point 12, each making a full turn thereover from points adjacent the base of point 12 to the outer extremity 13 thereof.

Spiral ribs 26 and 27 are provided on point 12 to insure positive rotation of point 12 as the blade and the point are pulled through the ground, thus affirmatively insuring constant rotation of point 12 as the blade and point are pulled through the ground. However, as indicated, longitudinal bore 16 within point 12 is preferably bored therein off-center of the axis of point 12, as shown, to insure off-center rotation of point 12, which sets up a vibration or oscillation in blade B to facilitate its cutting action.

A modified embodiment of the cutter point and shaft structure is shown in FIG. 3 of the drawings. In this embodiment, the rearward configuration of shaft 10 is identical to that shown in FIG. 2, comprising cylindrical bearing shoulder 17 and split locking ring 20 set into appropriate peripheral grooves or recesses in the interior wall or point 12. In this embodiment, roller bearings 28, set into an appropriate peripheral recess 29 in the inner wall of point 12 are substituted for the ball bearing race 21 of the embodiment shown in FIG. 2. Bearing housing 30 holding tapered thrust bearings 31 is provided within the forward extremity of bore 16. The forward extremity of shaft 10 is forwardly reduced to work in tapered thrust bearings 31. The ball bearing 24 at the forward extremity of shaft 10 and its hemispherical recesses 23 and 25 are identical to those shown in FIG. 2.

Here again, it will be noted that the cylindrical bore in point 12 is preferably made slightly off the longitudinal axis of point 12 to provide vibration or oscillation as point 12 rotates off-center on forward motion of the blade B through the ground.

In the embodiments shown in FIGS. 2 and 3 the bore 16 within cutter point 12 may be made on the longitudinal axis of the point, if desired. If the bore is so made, the point will rotate concentrically, rather than eccentrically, on shaft 10, but the rotation of the point will greatly ease penetration of the blade, reduce the power necessary to pull the blade, and will also set up a considerable degree of vibration in the blade. If the point is so mounted on shaft 10, shaft 10 may be inclined downward at a slight angle to increase the vibratory effect of the cutter point on the blade.

In both of these embodiments it will be obvious that if it is desired to remove the point 12 from the outer extremity of shaft 10 it is merely necessary to compress the locking ring 20 within slot 19 and remove it, whereupon the entire point assembly may be readily removed from the outer extremity of the shaft 10. Thus, replacement and repair of the cutter points is facilitated.

Referring now to FIG. 4 of the drawings, an alternative embodiment of the cutter point structure is shown in this figure. In this embodiment, the cutter point has been modified from a ribbed cone, as shown in FIGS. 1, 2, 3 and 5, to an auger or bit type rotating cutter 32. Auger 32 is about 3½ turns, as shown, and is provided at its base extremity with flattened, circular bearing surface 33 which closely and rotatably engages the rectilinear forward surface 34 of the forward extremity of the foot 35 of blade B.

As shown, foot 35 of blade B of this embodiment is provided with a longitudinally extending, cylindrical bore 36 in which shaft 37 is rotatably mounted. At its rear face 33 auger 32 is centrally recessed at 38, to receive the forward extremity 39 of shaft 37, which is appropriately welded, bolted or otherwise permanently affixed therewithin whereby auger 32 and shaft 37 rotate as a unit.

Adjacent its forward extremity, shaft 37 is provided with cylindrical bearing shoulder 40 which fits closely and rotatably within the forward extremity of cylindrical bore 36 and is maintained therein by split ring 41 set in peripheral recess 42 cut into the forward wall of bore 36. A ball bearing race 43 is provided about shaft 37 adjacent shoulder 40 to insure free rotation of shaft 37 within bore 36 in the foot of the blade.

At its rear extremity, shaft 37 is hemispherically recessed at 44 to provide a bearing seat for ball bearing 45 which is fitted into hemispherical recess 46 provided in the rear wall of bore 36 within foot 35 of blade B.

It will thus be seen that as blade B is pulled through the ground auger 32 will rotate, penetrating the subsoil and easing the passage of the forward cutting edge of blade B therethrough. The rotation of auger 32 will set up an incidental vibration or oscillation in blade B which will further facilitate the penetration of blade B through hard or compacted soil.

Here again, if it is desired to remove auger 32 and shaft 37 from bore 36 it is merely necessary to compress the resilient split ring 41 within recess 42 to free the entire assembly and remove shaft 37 from bore 36 of the blade foot.

Referring now to the disclosure in FIG. 5 of the drawings, in this embodiment three conical, ribbed rotating heads 12, as shown in FIGS. 2 and 3, are provided along the edge of a cutting blade, which may be either a horizontal or a vertical cutting blade, and, as shown, are inclined at varying angularities to the edge of the blade to increase the ease of penetration thereof and accentuate the vibratory effect imparted to the blade.

As shown, in this embodiment lowermost point 12 is preferably set at a right angle to the edge of the blade. The center point is preferably inclined at a slight angle thereto and the upper point 12 is inclined at an even more acute angle.

This invention is susceptible of many embodiments and many combinations of cutting points, angularities therefor and point structures may be utilized without departing from the spirit of the invention.

Referring lastly to the embodiment of the invention shown in FIG. 1 of the drawings, in this embodiment the rotating point 12, made in conformity with the showings of FIGS. 2 or 3, is provided at the foot of the blade B of a hand-directed ditching machine designed to be power-drawn, which comprises broadly a main beam or body 47, a pair of forward wheels 48, a circular coulter blade 49 and handle means 50 affixed to the rear of extremity of beam 47 and extending upwardly and rearwardly therefrom. In this embodiment it will be noted that the blade B is affixed at its upper extremity to the beam 47 by means of bolts 51, 52 and 53 passed through appropriate bores in the rear extremity of beam 47 and corresponding bores in the upper extremity of blade B. A series of adjusting bores are provided in the upper portion of the blade structure, designated 54, 55 and 56, whereby, if it is desired to make a deeper cut, the bolts 51, 52 and 53 may be removed and the blade dropped with respect to the rear extremity of beam 47 with the bolts then being replaced through supplemental bores 54, 55 and 56 in the upper extremity of the blade to provide additional length to blade B beneath frame 47.

Experimental "runs" have established the improved results and saving in power expanded when using a blade provided with the novel rotating point. Thus, a test run was made using a Caterpillar model D–7 with 28,274 pounds drawbar pull where a Caterpillar D–8 with 45,526 pounds drawbar pull was required to pull a conventional blade through the same soil at the same depth. This is a difference of about 17,252 pounds of drawbar pull, two-thirds of the required power on a conventional blade.

The improved cutter points of the present invention may vary in size, depending upon the size and nature of the blade with which they are associated, and may also be varied in number and angularity with respect to the blade, depending upon the length and dimensions of the blade, the nature of the terrain being cut and the overall nature of the operation. Thus, in extremely large ditching and cable laying blades the points will be proportionately large and for small blades they will be proportionately reduced in size.

As indicated, the preferred mounting for the cutter points is longitudinally aligned in the foot of the cutting blade, as shown in FIGS. 1, 2, 3 and 4, and the manner of mounting the cutter points may be varied widely as long as the basic principles taught here are followed.

The bore in the cutter point receiving the shaft is preferably off-center of the longitudinal axis of the cutter point whereby eccentric rotating motion is imparted to the cutter point as it revolves on the shaft when the blade is pulled forwardly through the earth. The point may, however, be bored on its axis for true rotation thereon.

In the embodiments shown in FIGS. 1, 2, 3 and 5 the number of ribs about the periphery of the conical cutting points may be varied at will, two being the preferred number of ribs, but the number being susceptible to variation.

The invention is susceptible of numerous embodiments without departing from the spirit thereof. Throughout, equivalents may be substituted for elements of the combination within the spirit of the invention.

The specification is by way of illustration only. Attention is directed to the appended claims for a limitation of the scope of the invention.

What is claimed is:

1. An improved blade for ditching and cable laying machines comprising a cutter blade including a foot, a shaft affixed in the foot of said blade extending outwardly therefrom, a longitudinally bored, elongated conical cutter point rotatably fitted over said shaft and reduced to its forward extremity, spiral ribs disposed longitudinally of the outer surface of said point and extending substantially from the base to the outer extremity thereof, a mounting for said cutter point comprising a cylindrical shoulder disposed about the inner extremity of said shaft fitting a cylindrical recess in the inner periphery of said point, a ball bearing race about said shaft ahead of said shoulder and a ball bearing disposed between the outer end of said shaft and the forward, inner wall of said point.

2. In a ditching blade including a foot, a shaft affixed within the foot of the blade extending outwardly therefrom in longitudinal alignment with the foot of the blade, an elongate, conical point bored eccentrically of its axis rotatably mounted over the outer extremity of said shaft, spirally disposed ribs extending longitudinally of said point from its base to its outer extremity whereby rotation of said point as the blade is pulled through the earth sets up vibrations in said blade.

References Cited

UNITED STATES PATENTS

| | | | |
|---|---|---|---|
| 189,667 | 4/1877 | Snyder | 37—193 |
| 2,020,625 | 11/1935 | Thaheld | 175—343 |
| 2,631,389 | 3/1953 | Stovall et al. | 37—193 |

ABRAHAM G. STONE, *Primary Examiner.*

S. C. PELLEGRINO, *Assistant Examiner.*

U.S. Cl. X.R.

37—193